United States Patent
Nihashi

(10) Patent No.: US 8,953,205 B2
(45) Date of Patent: Feb. 10, 2015

(54) DATA DISPLAY DEVICE CAPABLE OF BEING POSITIONED TO BE VIEWABLE FROM ONE OF TWO OPPOSITE VIEWING DIRECTIONS

(71) Applicant: Toshiba TEC Kabushiki Kaisha, Tokyo (JP)

(72) Inventor: Kiyotaka Nihashi, Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 5 days.

(21) Appl. No.: 13/736,727

(22) Filed: Jan. 8, 2013

(65) Prior Publication Data
US 2013/0235420 A1 Sep. 12, 2013

(30) Foreign Application Priority Data
Mar. 6, 2012 (JP) ................................ 2012-049602

(51) Int. Cl.
| | |
|---|---|
| G06F 3/12 | (2006.01) |
| G06F 3/041 | (2006.01) |
| G06F 1/16 | (2006.01) |
| G07G 1/00 | (2006.01) |
| G07G 1/12 | (2006.01) |
| B41J 3/44 | (2006.01) |

(52) U.S. Cl.
CPC ............. *G06F 3/041* (2013.01); *G06F 3/1273* (2013.01); *G06F 1/16* (2013.01); *G07G 1/0018* (2013.01); *G07G 1/12* (2013.01); *B41J 3/445* (2013.01)
USPC ............ 358/1.15; 345/87; 345/108; 345/158; 345/173

(58) Field of Classification Search
CPC ... G06F 1/1601; G06F 1/1616; G06F 1/1618; G06F 1/162; G06F 1/1624; G06F 2200/1637
USPC ........................................ 345/649, 659, 173
See application file for complete search history.

(56) References Cited

U.S. PATENT DOCUMENTS

| | | | |
|---|---|---|---|
| 2005/0156024 A1* | 7/2005 | Ichikawa et al. ............... | 235/379 |
| 2010/0262504 A1* | 10/2010 | Tamura ............................ | 705/24 |
| 2011/0012858 A1* | 1/2011 | Brookes et al. ................ | 345/173 |
| 2011/0085297 A1* | 4/2011 | Wright-Johnson et al. ........................ | 361/679.55 |
| 2012/0001943 A1* | 1/2012 | Ishidera ......................... | 345/659 |
| 2012/0224200 A1* | 9/2012 | Nihashi ......................... | 358/1.12 |
| 2013/0135352 A1* | 5/2013 | Matsuda et al. .............. | 345/659 |

FOREIGN PATENT DOCUMENTS

| | | |
|---|---|---|
| JP | 2005-025324 | 1/2005 |
| JP | 2005-091507 | 4/2005 |

\* cited by examiner

*Primary Examiner* — Benny Q Tieu
*Assistant Examiner* — Marcellus Augustin
(74) *Attorney, Agent, or Firm* — Patterson & Sheridan, LLP

(57) ABSTRACT

According to one embodiment, this data display device has a display unit in which a rear support cover is mounted on the back surface of a rectangular display panel using a rotatably connected with a first hinge. This data display device has a main body that supports the display unit at a display angle. The main body is provided with a paper discharge unit for a built-in printer. The main body is rotatably connected to rear support cover via a second hinge. The data display device may be used in an operator mode, a first user mode in which the display unit is inclined in the direction opposite to the display angle for an operator by the second hinge, and a second user mode in which the display panel is rotated at an angle of inclination larger than the display angle for an operator by the first hinge.

20 Claims, 4 Drawing Sheets

DATA DISPLAY DEVICE CAPABLE OF BEING POSITIONED TO BE VIEWABLE FROM ONE OF TWO OPPOSITE VIEWING DIRECTIONS

CROSS-REFERENCE TO RELATED APPLICATION

This application is based upon and claims the benefit of priority from Japanese Patent Application No. 2012-049602, filed Mar. 6, 2012; the entire contents of which are incorporated herein by reference.

FIELD

Embodiments described herein relate generally to a data display device provided with a display panel, which is used in sales information management of, for example, display products, computers, and other items.

BACKGROUND

In general, a so-called "point of sale" ("POS") system is broadly used in sales information management in stores, retail outlets, etc. A terminal unit in a POS system, which has a display/input panel for displaying and inputting various kinds of information, which can be observed and manipulated by both a customer and a salesperson who are facing each other, is desirable. As an example of such a terminal unit, there is a terminal unit with a configuration in which a single display panel is rotatably mounted on a main body with a support arm and its display part can be changed to an angle facing a customer and an angle facing a salesperson by the rotation of the arm.

When this terminal unit is operated by an operator (who may be, for example, a salesperson), the display surface of the display panel is positioned at an angle for easy operation and viewing by the operator. When the display content of the display panel is to be displayed to the customer, the display surface of the display panel is directed towards the customer facing the operator by rotating the arm.

In this case, since the operator usually operates the display panel surface of the terminal unit while standing, the display panel is supported at an angle slightly inclined from horizontal toward the operator when the display panel is facing the operator. But when the customer operates or views the terminal to obtain product information, etc., often the customer observes the display panel of the terminal unit while sitting in a chair across from (at the position opposite to) the salesperson/operator, and carries out operations, such as, for example, product selection. For this reason, the display panel is inclined at nearly a right angle (relative to the horizontal plane of the floor) so that the customer sitting on the chair can easily observe the display panel.

In many of the data display devices that are used as the terminal unit in a POS system, a built-in printer is installed in the main body of the device. This built-in printer is used to print out data input by using the display surface as a touch panel or by operating a keyboard or other input device connected to the terminal Input data may be information on sales of products and price data on products that are purchased by customers. In addition, the discharge opening for papers printed by this printer is usually installed on the main body surface facing the operator rather than the customer. The reason for this discharge opening placement is that the price totaling of the sales products, settlement processing of credit cards, etc., are carried out by the operator, and the resulting printing-out of papers from such processing are also frequently processed by the operator. For this reason, the discharge opening placement has focused on device operability and functionality from the perspective of the operator rather than the customer.

However, when the customer carries out an operation, such as product selection by manipulating/touching the display panel surface, there may be many cases where the customer may also want to obtain a paper that is printed out from the POS terminal as a result of customer actions or selections But in such cases, since the paper discharge opening of the built-in printer is provided at the operator side, opposite to the customer, it is difficult for the customer to directly obtain the printed-out paper. Needless to say, if the operator is present at the spot, the paper may be picked up by the operator; however, in cases where the operator is away from his/her seat, etc., the printed-out paper may not be readily obtainable until the operator returns, causing inconvenience to the customer desiring a printout from the POS terminal.

The objective of the embodiments of the invention is to provide a data display device whose visibility and operability are improved by variously changing the display direction and the display angle of a display panel.

DETAILED DESCRIPTION

In general, according to one embodiment, the data display device of this invention is characterized in that it is provided with a display unit, in which a rear support cover with a plate shape, which has almost the same shape as that of a rectangular display panel with a tabular shape, is mounted on the back surface of the display panel and a first side portion where the display panel and rear support cover are rotatably connected with a first hinge, and a main body that supports this display unit at a display angle for an operator, in which a second side portion parallel with the first side portion is positioned higher than the first side portion with respect to the horizontal surface, is provided with a paper discharge unit for output from a built-in printer on the side surface of the first side portion, and is rotatably connected with the other side portion of the rear support cover via a second hinge; and each angle can be set in an operator mode in which the display unit is supported at the display angle for an operator onto the main body, a first user mode in which the display unit is inclined in the direction opposite to the display angle for an operator by the second hinge, and a second user mode in which the display panel of the display unit is rotated at an angle of inclination larger than the display angle for an operator by the first hinge.

Embodiments of the invention will be explained in detail below with reference to the drawings.

Figure 1:
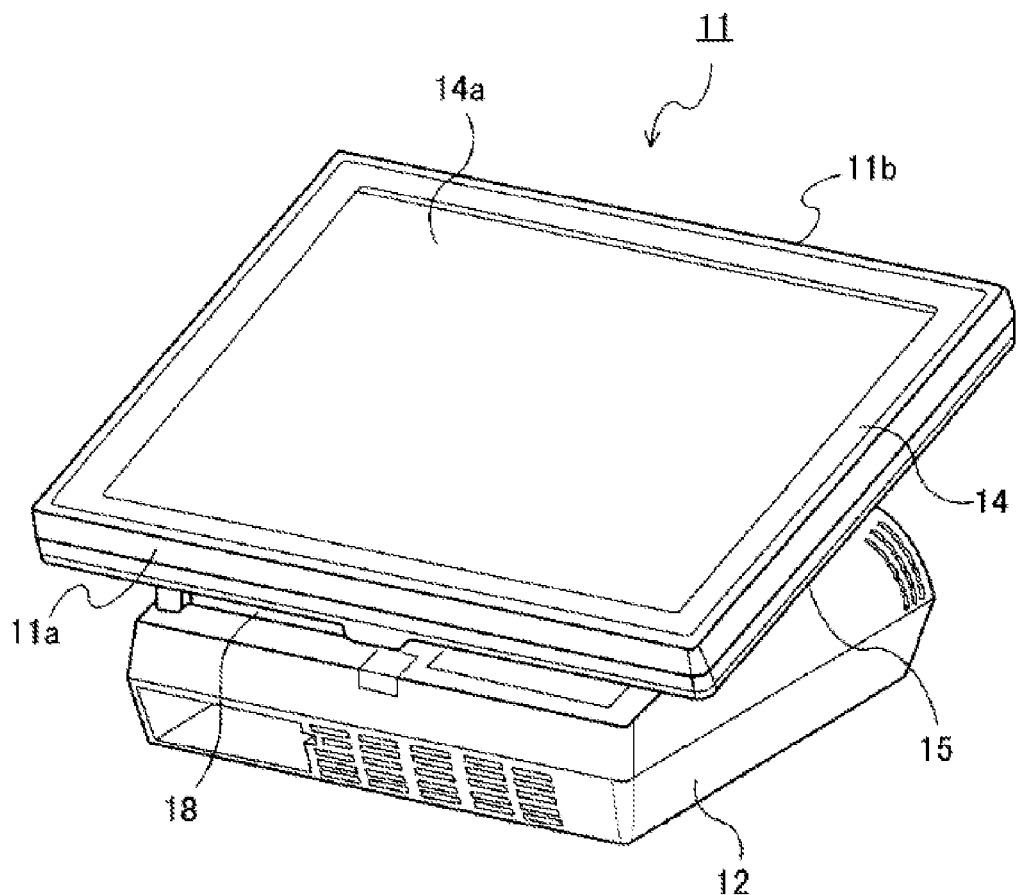
FIG. 1 is an oblique view showing an external shape of a data display device of one embodiment.
Figure 2:
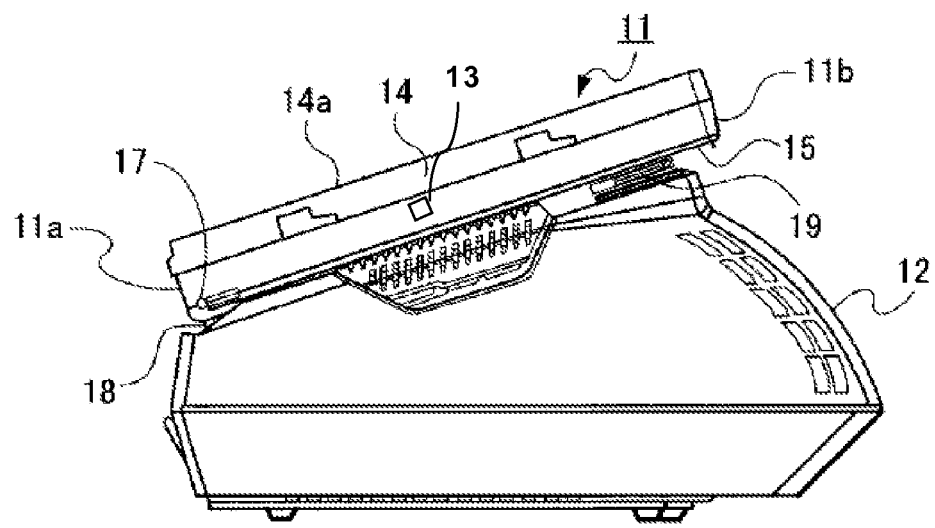
FIG. 2 is a side view showing a state in which the data display device of the embodiment is used in an operator mode.
Figure 3:
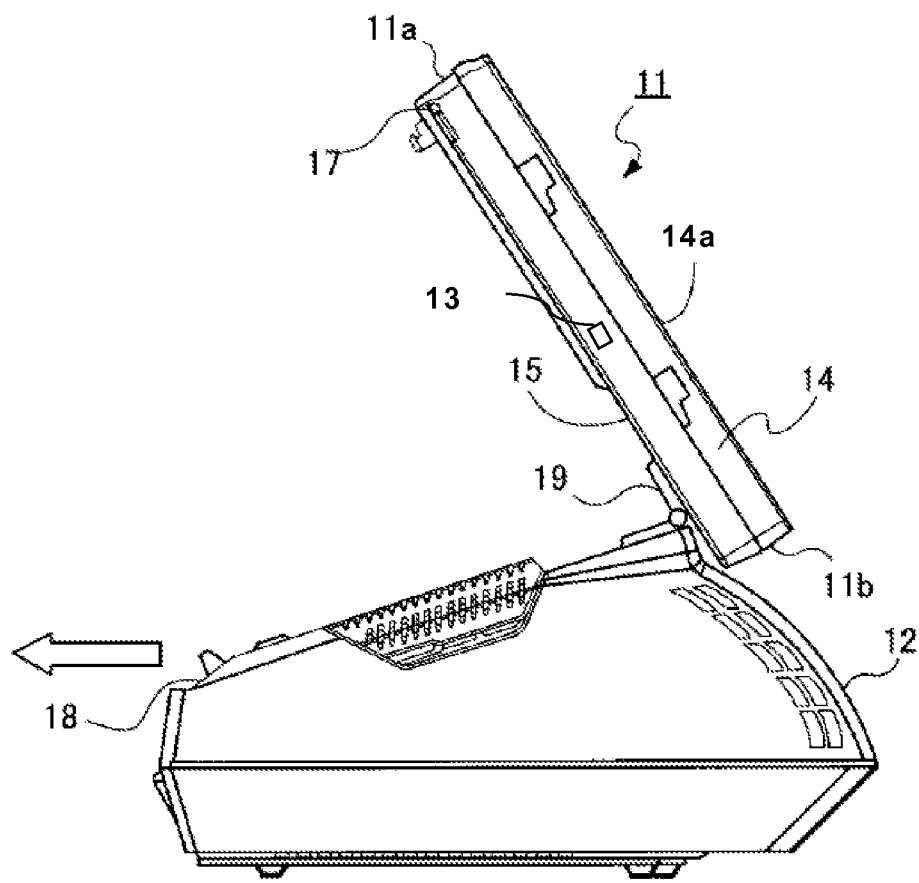
FIG. 3 is a side view showing a state in which the data display device of the embodiment is used in a first user mode.
Figure 4:
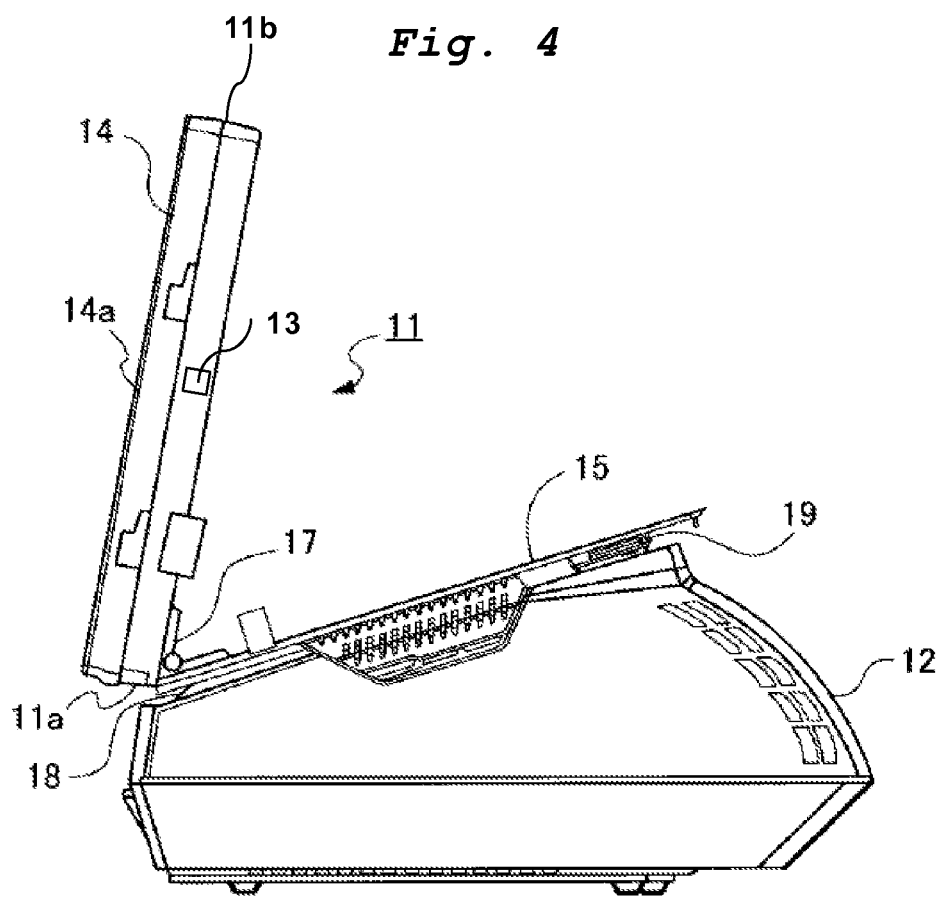
FIG. 4 is a side view showing a state in which the data display device of the embodiment is used in a second user mode.

FIG. 1 shows the shape of the data display device of this embodiment. FIGS. 2-4 show examples of each use state (mode) of the data display device. In other words, FIG. 2 shows the display device configured in an operator mode in which an operator, such as salesperson, or someone standing at the terminal, uses this device. FIG. 3 shows the display device configured in in a first user mode in which a customer or someone sitting opposite the operator uses this device. FIG. 4 shows the display device configured a second user mode in which the customer uses this device.

This data display device generally includes a display unit 11 and a main body 12 for supporting the display unit. The display unit 11 has a rectangular display panel 14 with a tabular shape and a rear support cover 15 mounted on the back surface of the display panel 14. As the display panel 14, a touch screen panel can be used and information can be entered by touching a display surface 14a. The rear support cover 15 is a plate shape, which is about the same planar shape as that of the display panel 14, and is mounted in a superposed state on the back surface of the display panel 14. In addition, a first side portion 11a of the display unit (shown as a lower side portion in FIGS. 1-3) corresponding to adjacent edges of display panel 14 and rear support cover 15 is connected rotatably by a hinge 17.

This main body 12 supports the display unit 11 at a first display angle (hereinafter, referred to as a display angle for an operator) in which a second side portion 11b (shown as an upper side portion in FIGS. 1-3) parallel with the first side portion 11a is positioned higher than the first side portion 11a with respect to the horizontal surface as shown in FIG. 2. This display angle for an operator is an angle for the operator to observe easily in standing position and for easy input operation. The use state at this display angle for an operator is called an operator mode.

However, the first side portion 11a and the second side portion 11b of the display unit 11 are adaptable and are movable (positionable) relative to the main body 12 in order to reposition the display panel 14 for different user modes as well as different viewing angles.

In addition, a paper discharge unit 18 for output from a built-in printer is installed on a side surface of the this main body 12 on the operator side, in other words, on the same side of the display device with the first side portion 11a when the display unit 11 is set at the operator angle (first display angle). Moreover, a hinge 19 is installed between the main body 12 on the user side (right hand side in FIGS. 2-4) and the second side portion 11b of the rear support cover 15, and as shown in FIG. 3, the entire display unit 11 including the rear sheet cover 15 is pivotally supported in a rotatable way.

Here, as shown in FIG. 2, the use state in which the display unit 11 is supported at a display angle for an operator on the main body 12, as mentioned above, is called an operator mode. In addition, as shown in FIG. 3, the use state in which the display unit 11 is inclined in the direction of the user side (right direction in the drawing), that is, opposite to the display direction when the display device is set at the first display angle shown in FIG. 1, by the hinge 19 is called a first user mode. Moreover, as shown in FIG. 4, the use state in which the display panel 14 of the display unit 11 is rotated at an angle of inclination larger than the display angle for an operator shown in FIG. 1 by the hinge 17 is called a user mode. In other words, in this embodiment, the display panel 14 of the display unit 11 is configured so that it can be set to each angle in operator mode, first user mode, and second user mode.

Provided in the display unit 11 is a sensor 13, for detecting what angle the display panel 14 of the display 11 is set to in the use state of which mode: the operator mode, first user mode, or second user mode; and the display content is switched in accordance with the setting angle of the display panel 14. For example, in the first user mode shown in FIG. 3, since the top and bottom of the display surface 14a of the display panel 14 is inverted, compared with the other modes shown in FIGS. 2 and 4, the screen display on the display surface 14a is vertically inverted according to a detecting signal of the sensor 13 by a well-known method. In addition, since the confidentiality level of information that is processed by an operator and a customer is different, if the same screen is displayed on both of them, a problem is sometimes caused in terms of confidential information management. Accordingly, the display content may be changed depending on the direction the display surface 14a is facing.

Here, for example, a gravity-type sensor is used as the sensor 13. The gravity-type sensor has a shield body (not shown in the drawing), which is vertically moved in accordance with the use state (setting angle) of the display panel 14 by gravity, and a sensor unit not shown in the drawing) for changing the output along with the vertical movement of the shield body. Needless to say, for example, an angle sensor for detecting the rotation angle of the display panel 14, etc., other than the gravity-type one may also be used as the sensor 13.

In the configuration mentioned above, when the operator carries out a tallying process of sales products on the display surface 14a of the display panel 14, the display unit 11 is set to an angle in the operator mode shown in FIG. 2 to carry out the operation. Usually, since the operator, who may also be as a salesperson, carries out an input operation into the display surface 14a of the display panel 14 in standing position, it is easy for the operator to view and verify the displayed content and to carry out the input operation into the display surface 14a, improving work efficiency, because of the display surface 14a being slightly inclined to the operator side with respect to the horizontal surface, as shown in FIG. 2.

On the other hand, when attempting to convey product information to the customer who is facing the operator, the entire display panel 11 is rotated about an axis provided by the hinge 19 as a support point so that the display surface 14a of the display panel 14 is facing toward the customer side (right side in the drawing), setting an angle in the first user mode shown in FIG. 3. In this case, since the customer frequently sits on a chair, the display surface 14a is set to a large angle with respect to the horizontal surface. With such an angle setting, the customer sitting on the chair can easily, visually recognize the display content of the display surface 14a.

In addition, in case the customer operates the display surface 14a while visually recognizing it, for example, the operator carries out a tallying process of the sales products and displays the tallying result on the customer, and the customer confirms the result, operates a confirmation button, and prints out a totaling slip. In this case, the operator carries out a tallying process in the operator mode shown in FIG. 2. Next, the display panel is rotated about an axis provided by the hinge 17 to position the display panel 14 in the second user mode shown in FIG. 4. In the state of FIG. 4, the display surface 14a of the display panel 14 and the paper discharge unit 18 are facing the operator (left side in the drawing). However, the operator (or customer) may change a direction of the main body 12 so that the display surface 14a of the display panel 14 and the paper discharge unit 18 for output of the built-in printer of the main body 12 are facing toward the customer side (right side in the drawing).

With these operations, the display surface 14a is facing the customer sitting on a chair opposite to the operator. After confirming the display content, the customer touches the confirmation button on the display surface 14a. The built-in printer of the main body 12 is operated by the confirmation operation, prints the totaling result as the display content, and outputs the output paper from the paper discharge unit 18 for output. At that time, since the customer is facing the paper discharge unit 18 for output as mentioned above, the printed output paper can be immediately obtained, even if the operator is away from his/her seat.

Figure 5:
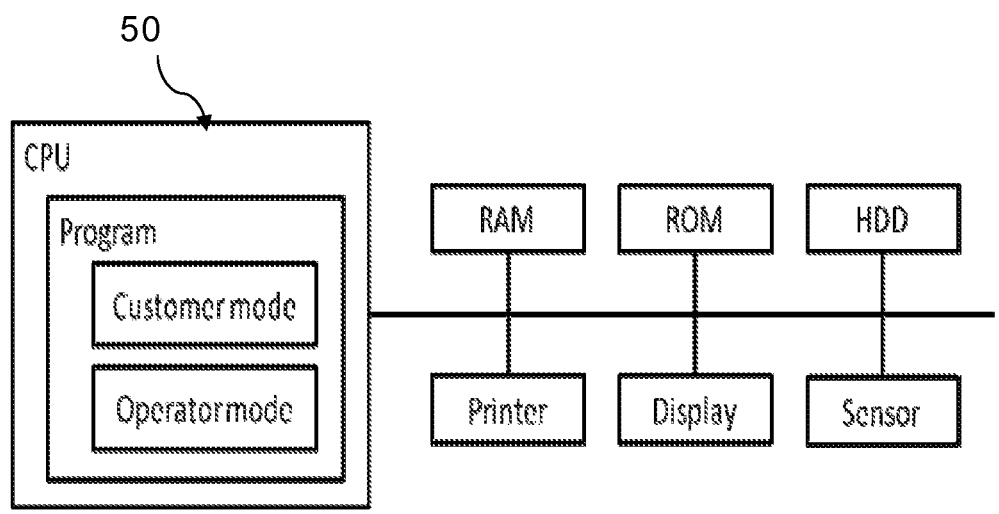
FIG. 5 is a schematic block diagram showing one embodiment of a computer system for the data display device according to embodiments described herein

FIG. 5 is a schematic block diagram showing one embodiment of a computer system 50 for the data display device according to embodiments described herein. The computer system 50 comprises hardware and software for enabling operability of the display panel 14 in a customer mode and an operator mode.

Therefore, since the display direction and the display angle of the display panel 14 can be variously changed, the visibility and the operability of the display content are improved for both the operator and the customer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data display device, comprising:
   a main body that is supportable on a horizontal surface;
   a rear panel rotatably coupled to the main body by a first hinge; and
   a display unit rotatably coupled to the rear panel by a second hinge and movable with respect to the main body,
   wherein the display unit comprises a first side and a second side that is parallel with the first side, and
   wherein the main body supports the display unit at a first position defined by a first display angle and a first display direction, when the first side is positioned at an elevation greater than the second side, and
   wherein the main body supports the display unit at a second position defined by a second display angle and a second display direction that is different than the first display direction, when the second side is positioned at an elevation greater than the first side.

2. The data display device of claim 1, wherein the display unit comprises a touch screen display, and the orientation of the touch screen display is different in each of the first display angle and the second display angle.

3. The data display device of claim 1, wherein the display unit comprises a sensor and a touch screen display.

4. The data display device of claim 3, wherein the sensor inverts the touch screen display based on the position of the display unit.

5. The data display device of claim 1, wherein the main body comprises a paper discharge unit.

6. The data display device of claim 5, wherein the paper discharge unit is disposed adjacent the first side of the display unit in the first display angle.

7. A data display device, comprising:
   a main body that is supportable on a horizontal surface;
   a rear panel rotatably coupled to the main body by a first hinge;
   a display unit rotatably coupled to the rear panel by a second hinge and movable with respect to the main body,
   wherein the display unit comprises a first side and a second side that is parallel with the first side, and
   wherein the main body supports the display unit at a first position defined by a first display angle and a first display direction, when the first side is positioned at an elevation greater than the second side; and
   a paper discharge opening disposed in the main body, adjacent the first side of the display in the first display angle;
   wherein, the main body supports the display unit at a second position defined by a second display angle and a second display direction that is different than the first display direction, when the second side is positioned at an elevation greater than the first side.

8. The data display device of claim 7, wherein the data display device can be set in:
   an operator mode in which the display unit is supported on the main body at the first display angle and facing the first display direction,
   a first user mode in which the display unit is at the second display angle and facing the second display direction, the second display direction being opposite to the first display direction, and
   a second user mode in which a display panel of the display unit is at a third display angle and facing the first display direction, the third display angle differing from the first display angle.

9. The data display device of claim 7, wherein the display unit comprises a touch screen display, and the orientation of the touch screen display is different in each of the first display angle and the second display angle.

10. The data display device of claim 7, wherein the display unit comprises a sensor and a touch screen display.

11. The data display device of claim 10, wherein the display unit comprises a sensor for inverting the touch screen display based on the position of the display unit.

12. A method for operating a data display device having a display unit disposed on a main body that is supportable on a horizontal surface, the method comprising:
   moving the display unit with respect to the main body to position the display unit at a first position defined by a first display angle and a first display direction;
   moving the display unit with respect to the main body to position the display unit on the main body at a second position defined by a second display angle and a second display direction that is different from the first display direction;
   wherein, moving the display unit with respect to the main body to position the display unit at the first position comprises rotating the display unit about a first axis provided by a first hinge coupled between the main body and a rear panel, and moving the display unit with respect to the main body to position the display unit at the second position comprises rotating the display unit about a second axis provided by a second hinge coupled between the rear panel and the display unit.

13. The method of claim 12, further comprising:
   determining whether the display unit is at the first display angle or the second display angle;
   controlling the display unit to display information based on whether the display unit is at the first display angle or second display angle.

14. The method of claim 13, wherein controlling the display unit to display information based on the display angle comprises inverting an image displayed on the display unit.

15. The method of claim 14, wherein the determination of whether the display unit is at the first display angle or the second display angle is based on an output of a sensor disposed in the display unit.

16. The method of claim 15, further comprising:
controlling a printer unit disposed within the main body to cause the printer unit to output printed matter through a paper discharge opening disposed in the main body.

17. The method of claim 16, wherein the display unit comprises a first side and a second side that is parallel with the first side, and the first display angle consisting of the first side being positioned at an elevation greater than the second side, and the paper discharge unit is disposed in the main body, adjacent the first side of the display in the first display angle.

18. The method of claim 17, wherein the first display angle is different than the second display angle, and the second display angle consists of the second side being positioned at an elevation greater than the first side.

19. The method of claim 18, wherein the display unit can be set in an operator mode in which the display unit is supported on the main body at a display angle for an operator, the display unit can be set in a first user mode in which the display unit is inclined in the direction opposite to the display angle for the operator by the second hinge, and the display unit can be set in a second user mode in which the display panel of the display unit is rotated at an angle of inclination larger than the display angle for the operator by the first hinge.

20. The method of claim 19, wherein the display unit further comprises a touch screen display.

* * * * *